(12) United States Patent
Lim et al.

(10) Patent No.: US 7,613,018 B2
(45) Date of Patent: Nov. 3, 2009

(54) APPARATUS AND METHOD FOR SUPPLYING DC POWER SOURCE

(75) Inventors: Sun-Kyoung Lim, Gyeonggi-Do (KR); Dai-Hyun Kim, Gyeonggi-Do (KR); Hag-Wone Kim, Chungcheongnam-Do (KR)

(73) Assignee: LG Electronics Inc., Seoul (KR)

( * ) Notice: Subject to any disclaimer, the term of this patent is extended or adjusted under 35 U.S.C. 154(b) by 333 days.

(21) Appl. No.: 11/532,550

(22) Filed: Sep. 18, 2006

(65) Prior Publication Data
US 2007/0217233 A1 Sep. 20, 2007

(30) Foreign Application Priority Data
Mar. 14, 2006 (KR) .................. 10-2006-0023714

(51) Int. Cl.
*H02M 5/40* (2006.01)
(52) U.S. Cl. .......................................... 363/34; 363/89
(58) Field of Classification Search .................. 363/34, 363/37, 84, 89, 125
See application file for complete search history.

(56) References Cited

U.S. PATENT DOCUMENTS

| | | | | |
|---|---|---|---|---|
| 5,373,223 | A * | 12/1994 | Akagi et al. ................. | 318/722 |
| 5,793,623 | A | 8/1998 | Kawashima et al. | |
| 6,204,627 | B1 * | 3/2001 | Watanabe et al. ........... | 318/729 |
| 6,671,192 | B2 | 12/2003 | Maeda et al. | |
| 7,049,774 | B2 | 5/2006 | Chin et al. | |
| 2003/0165070 | A1 | 9/2003 | Maeda et al. | |
| 2005/0258793 | A1 | 11/2005 | Chin et al. | |

FOREIGN PATENT DOCUMENTS

| | | |
|---|---|---|
| CN | 1367573 | 9/2002 |
| CN | 1700130 | 11/2005 |
| EP | 0695024 | 1/1996 |
| EP | 1598925 | 11/2005 |
| JP | 5-068376 | 3/1993 |

OTHER PUBLICATIONS

English Language Abstract of JP 5-068376.
U.S. Appl. No. 11/470,321 to Lim et al., filed Sep. 6, 2006.
English Language Abstract of JP 5-068376, Mar. 19, 1993.

* cited by examiner

*Primary Examiner*—Adolf Berhane
(74) *Attorney, Agent, or Firm*—KED & Associates LLP

(57) ABSTRACT

An apparatus and method for supplying a direct current power source which is capable of compensating a power factor of an input power source by detecting an input current amount according to load changes, the apparatus comprising an input current detecting unit for detecting an input current amount to determine a load size, a power factor control unit for outputting a power factor control signal and an input current amount control signal according to the determined load size, an input current refluxing unit for refluxing the input current by cutting off an input power source based upon the input current amount control signal, an active filter for reducing a harmonic of the input current, rectifying an input alternating current (AC) voltage and boosting a smoothing voltage, a power factor compensating unit for supplying charged energy to the load based upon the power factor control signal, a smoothing unit for smoothing the rectified input AC voltage into a direct current (DC) voltage, and an inverter for converting the smoothed DC voltage into an AC voltage, whereby a power factor compensation (PFC) spec can be satisfied although the load is increased and fabricating cost can be decreased by allowing the use of a reactor with a low capacity.

21 Claims, 5 Drawing Sheets

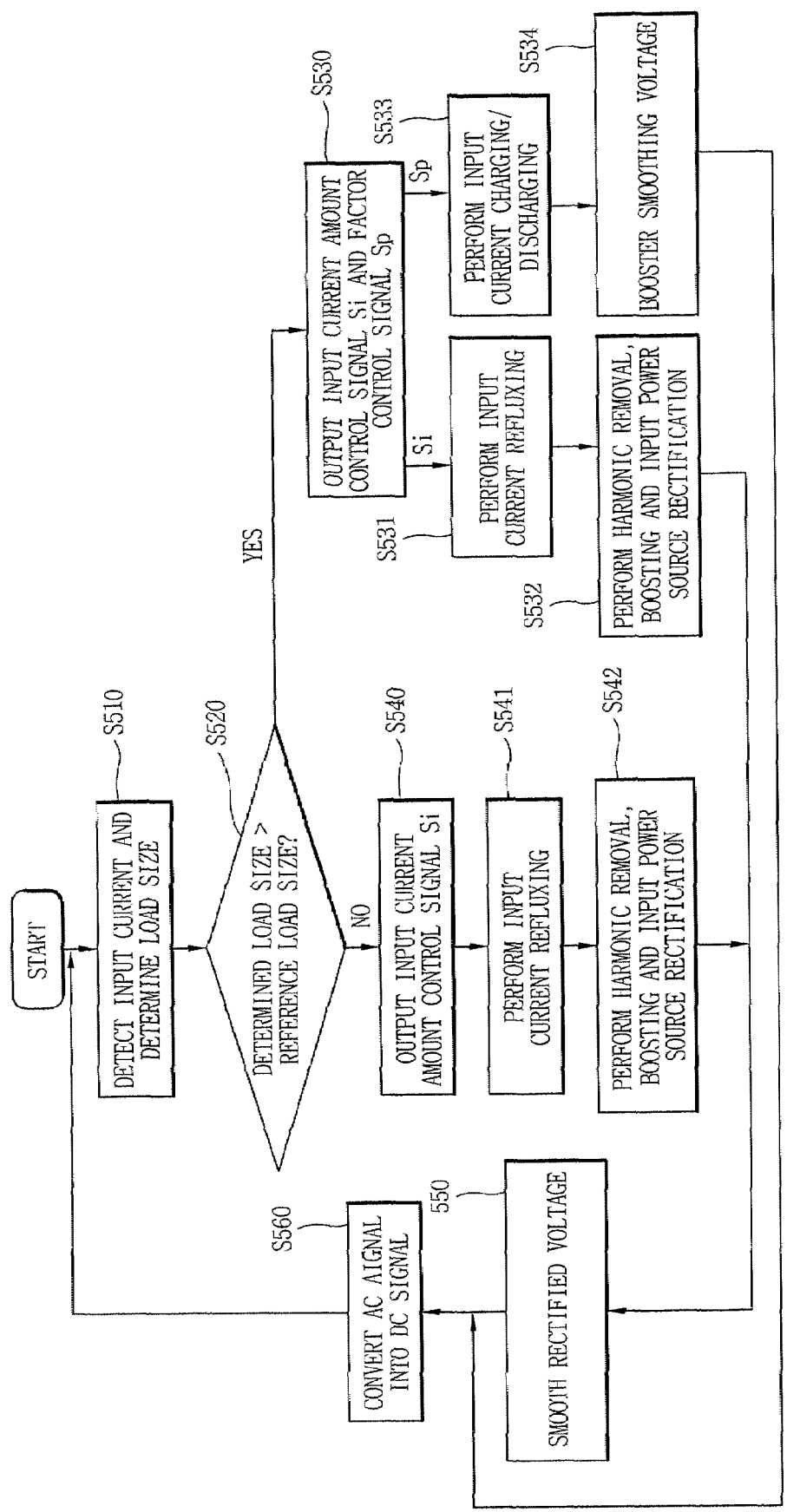

APPARATUS AND METHOD FOR SUPPLYING DC POWER SOURCE

RELATED APPLICATION

The present disclosure relates to subject matter contained in priority Korean Application No. 10-2006-0023714, filed on Mar. 14, 2006, which is herein expressly incorporated by reference in its entirety.

BACKGROUND OF THE INVENTION

1. Field of the Invention

The present invention relates to an apparatus and method for supplying a power source, and particularly, to an apparatus and method for supplying a DC power source for driving a compressor of an air conditioner.

2. Background of the Invention

Air conditioners are currently using a three-phase motor as a driving motor of a compressor. A power source supply apparatus of the three-phase motor converts Alternating Current (AC) of a commercial power source into Direct Current (DC), and thereafter re-converts the converted DC into the AC using an inverter. The re-converted AC is then applied to the three-phase motor to drive it.

An apparatus for supplying a DC power source according to the related art will now be explained with reference to FIGS. 1 and 2 hereafter.

FIG. 1 is a view showing an apparatus for supplying a DC power source according to the related art.

As shown in FIG. 1, an apparatus for supplying a DC power source according to the related art includes a converter 110 provided with an active filter 111 and a smooth capacitor C to thus convert an AC voltage inputted from a commercial power source into a DC voltage, and an active filter controlling unit 120 for controlling the active filter 111.

The converter 110 outputs the converted DC voltage to an inverter 130. The inverter 130 converts the DC voltage from the converter 110 into an AC voltage to supply it to a three-phase motor 140 for driving a compressor.

The active filter controller 120 includes a synchronous signal generator 121 for generating a synchronous signal by detecting a zero voltage of the DC voltage inputted from the commercial power source, and an on/off controller 122 for generating control signals, which are used to drive power semiconductor devices Q1 and Q2 of the active filter 111, by being synchronized with the synchronous signal generated from the synchronous signal generator 121.

The active filter 111 is composed of a reactor L and the power semiconductor devices Q1 and Q2, and accordingly forms a waveform phase of an input current to be approximately similar to a phase of an input voltage (i.e., to be a sine wave). Hence, the active filter 111 controls the input current to allow a performing of a harmonic removal and a Power Factor Compensation (PFC).

The smooth capacitor C smoothes out an output voltage of the active filter 111 into a DC voltage, and supplies the smoothed DC voltage to the inverter 130.

FIGS. 2(a) and 2(b) are waveform views of an input current of an apparatus for supplying the DC power source according to the related art.

As shown in FIG. 2(a), in an apparatus for supplying the DC power source according to the related art, the power semiconductor devices Q1 and Q2 are alternatively driven once for a certain time within a half period, and accordingly the input voltage waveform toward the smooth capacitor C based upon the AC voltage of the commercial power source has a great peak value of a current with a narrow conducting width.

As shown in FIG. 2(b), for using a small reactor in the apparatus for supplying the DC power source according to the related art, since an input current amount according to load changes is not sufficient, the waveform of the input current is more greatly fluctuated as compared to the waveform of FIG. 2(a) according to the related art in which the small reactor is not used.

However, the apparatus for supplying the DC power source according to the related art drove the active filter 300 without considering the load changes, in case of a high load, it was difficult to satisfy the PFC specification.

Furthermore, in case of a low load, the apparatus for supplying the DC power source according to the related art occurred a loss of the power semiconductor device due to the PFC operation.

In addition, the apparatus for supplying the DC power source according to the related art increased a fabricating cost due to using the reactor L with a great capacity for the harmonic removal and the PFC.

SUMMARY OF THE INVENTION

Therefore, an object of the present invention is to provide an apparatus and method for supplying a direct power source which is capable of improving a power factor of an input power source by detecting an input current amount according to load changes to determine a load size, controlling the power factor based upon the determined load size, and varying a current amount supplied to the load, and which is also capable of decreasing a fabricating cost by using a reactor with a low capacity.

To achieve these and other advantages and in accordance with the purpose of the present invention, as embodied and broadly described herein, there is provided an apparatus for supplying a direct current (DC) power source comprising: an input current detecting unit for detecting an input current amount to determine and output a load size; a power factor control unit for outputting a power factor control signal and an input current amount control signal according to the determined load size; an input current refluxing unit for refluxing the input current by cutting off an input power source based upon the input current amount control signal; an active filter for reducing a harmonic of the input current, rectifying an input alternating current (AC) voltage and boosting a smoothing voltage; a power factor compensating unit for supplying charged energy to the load based upon the power factor control signal; a smoothing unit for smoothing the rectified AC voltage into a DC voltage; and an inverter for converting the DC voltage of the smoothing unit into an AC voltage.

To achieve these and other advantages and in accordance with the purpose of the present invention, a method for supplying a DC power source comprises: detecting an input current amount to determine and output a load size; outputting a power factor control signal and an input current amount control signal according to the determined load size; refluxing the input current by cutting off an input power source based upon the input current amount control signal; reducing a harmonic of the input current, rectifying an input alternating current (AC) voltage and boosting a smoothing voltage; supplying charged energy to the load based upon the power factor control signal; smoothing the rectified AC voltage into a DC voltage; and converting the DC voltage of the smoothing unit into an AC voltage.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 is a flowchart showing an embodiment of a method for supplying a DC power source according to the present invention.

DETAILED DESCRIPTION OF THE INVENTION

Description will now be given in detail of the present invention, with reference to the accompanying drawings.

Preferred embodiments of an apparatus and method for supplying a direct current (DC) power source according to the present invention will now be explained in detail with reference to FIGS. 3 through 7 hereafter.

Figure 1:
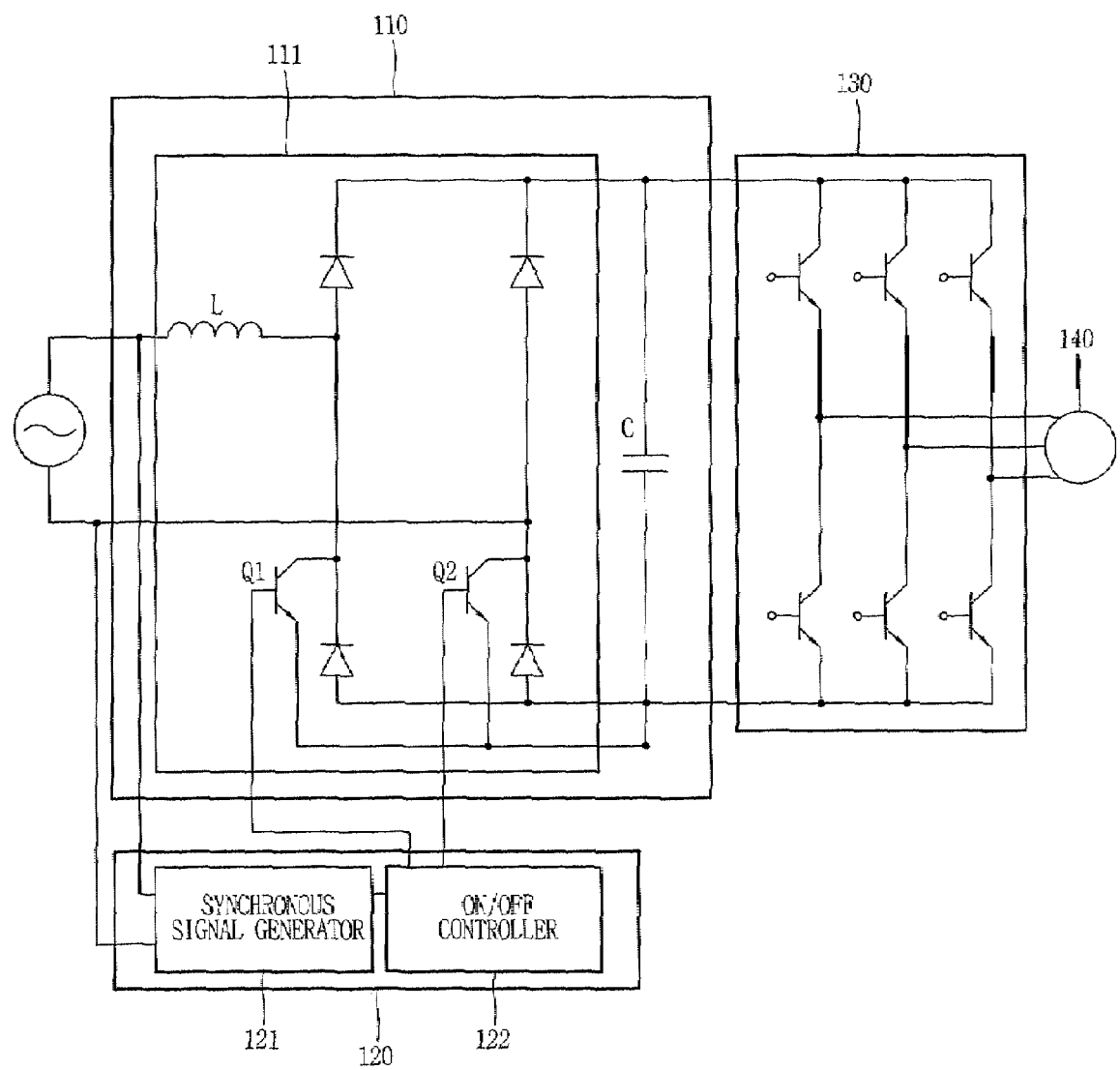
FIG. 1 is a view showing an apparatus for supplying a DC power source according to the related art.
Figure 2A:
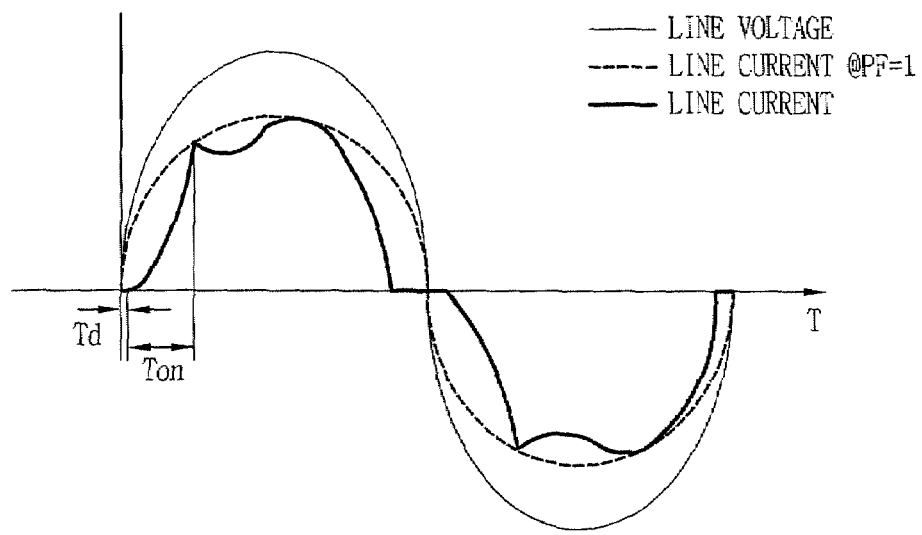
FIGS. 2(a) and 2(b) are waveform views of an input current of an apparatus for supplying a DC power source according to the related art.
Figure 2B:
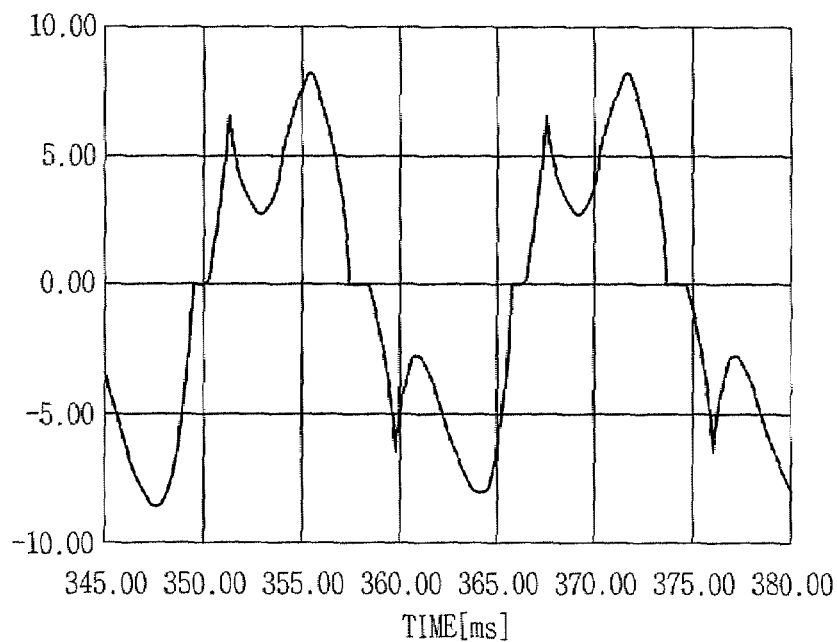
Figure 3:
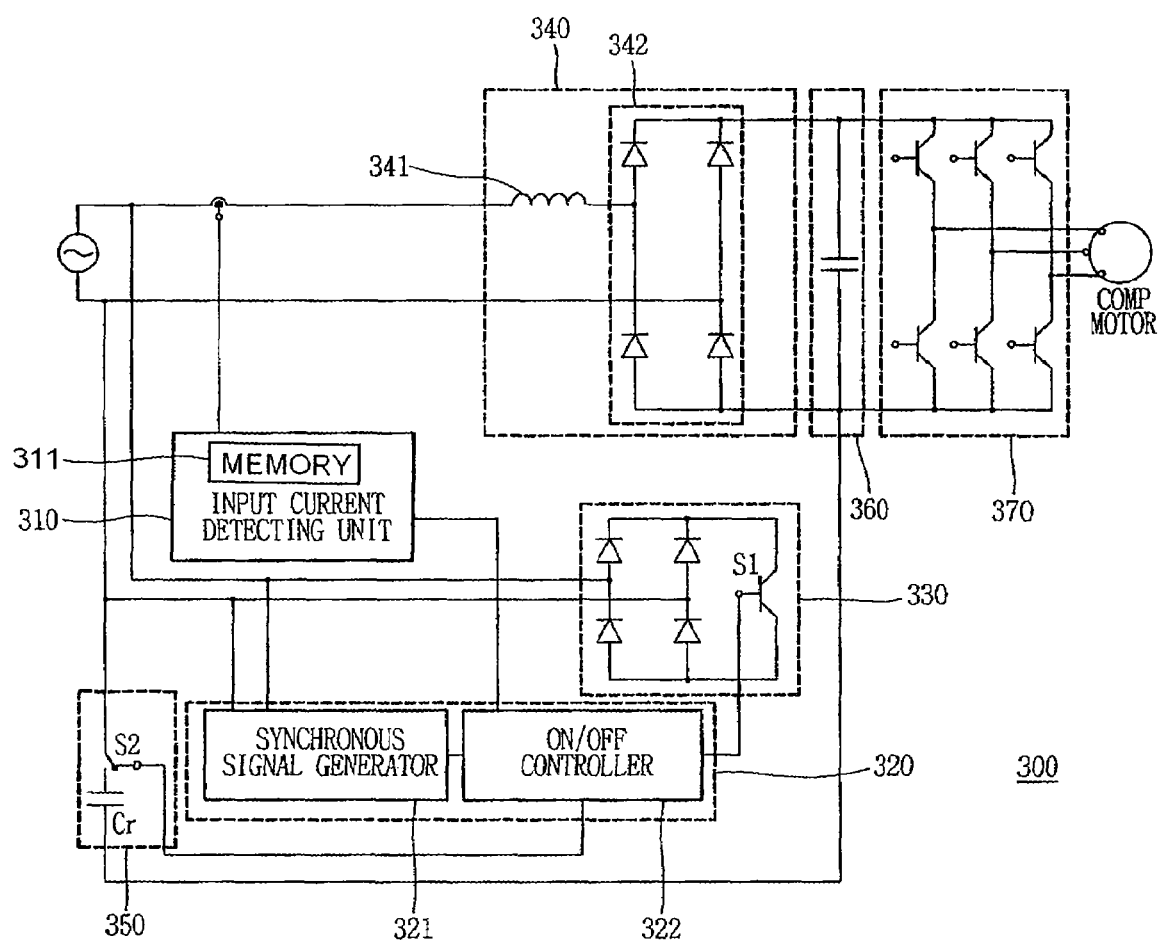
FIG. 3 is a circuit view showing an embodiment of an apparatus for supplying a DC power source according to the present invention.
Figure 4:
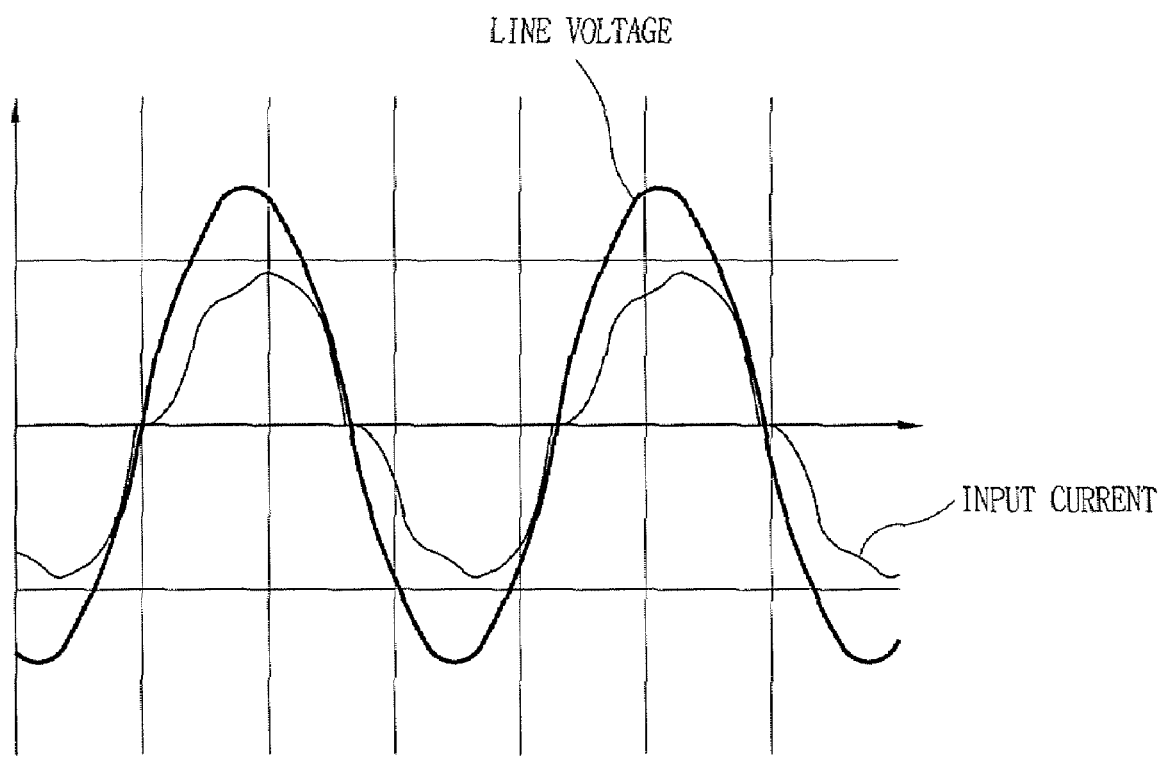
FIG. 4 is a waveform view of an input current when controlling a power factor in accordance with an embodiment of the present invention.

As shown in FIG. 3, a DC power source supply apparatus 300 according to the present invention comprises an input current detecting unit 310 for detecting an input current amount to determine and output a load size, a power factor control unit 320 for outputting a power factor control signal and an input current amount control signal according to the determined load size, an input current refluxing unit 330 for refluxing the input current by cutting off an input power source based upon the input current amount control signal, an active filter 340 for reducing a harmonic of the input current, rectifying an input alternating current (AC) voltage and boosting a smoothing voltage, a power factor compensating unit 350 for supplying charged energy to the load based upon the power factor control signal, a smoothing unit 360 for smoothing the rectified input AC voltage into a DC voltage, and an inverter 370 for converting the DC voltage of the smoothing unit 360 into an AC voltage.

The input current detecting unit 310 further includes a memory 311 for storing a data table showing a relation between an input current amount obtained by an experiment and load size corresponding thereto. The input current detecting unit 310 determines the load size based upon the input current amount detected by the data table.

Also, the input current detecting unit 310 may detect a DC-link current to determine the load size.

The power factor control unit 320 includes a synchronous signal generator 321 for detecting a zero-crossing time point of an input power source and generating a synchronous signal based upon the detected zero-crossing time point, and an on/off controller 322 for outputting an input current amount control signal to control a first switch S1 and a power factor control signal to control a second switch S2 based upon the determined load size.

Here, the input current amount control signal and the power factor control signal are synchronized with the synchronous signal.

The synchronous signal generator 321 detects a time point when the input power source becomes a zero voltage. The synchronous signal generator 321 generates the synchronous signal based upon the detected time point to output it to the on/off controller 322. Here, the synchronous signal is synchronized at a starting time point of a plus (+) half period or minus (−) half period of the input power source.

When the determined load size is smaller than a reference load size, the on/off controller 322 turns off the second switch S2 and then outputs the input current amount control signal to control the first switch S1, whereas when the determined load size is equal to or greater than the reference load size, the on/off controller 322 outputs both the input current amount control signal to control the first switch S1 and the power factor control signal to control the second switch S2.

Here, the on/off controller 322 varies each switching time of the first and second switches S1 and S2 according to the load sizes.

In addition, the on/off controller 322 determines a Pulse Width Modulation (PWM) ratio of each of the input current amount control signal and the power factor control signal in proportion to the load sizes.

The input current refluxing unit 330 includes a diode bridge circuit for forming a reflux path of the input current toward the input power source, and the first switch S1 for turning on/off the reflux path of the input current according to the input current amount control signal.

The active filter 340 includes a small reactor 341 for reducing a harmonic and boosting a smoothing voltage, and a diode bridge circuit 342 for rectifying the input AC voltage.

In more detail, the small reactor 331 reduces the harmonic of the input current, and boosts the smoothing voltage by a switching of the second switch S2. The small reactor 331 also prevents an influx of an inrush current. The diode bridge circuit 332 fully rectifies an AC voltage supplied from a commercial power source.

The power factor compensating unit 350 compensates a power factor of is the input power source by charging and discharging energy based upon the power factor control signal.

In more detail, the power factor compensating unit 350 includes a capacitor Cr for charging energy from the input power source and discharging energy to the smoothing unit 360, and a second switch S2 for turning on/off a path for charging/discharging energy.

When the first switch S1 is turned on, the capacitor Cr refluxes the input current toward the input power source without being charged/discharged. On the other hand, when the first switch S1 is turned off, the capacitor Cr is charged in case that the input power source is plus (+) by a switching of the second switch S2 based upon the power factor control signal, and discharged in case that the input power source is minus (−).

In addition, the power factor compensating unit 350 alternately charges/discharges energy in correspondence to a half period of the input power source based upon the power factor control signal, thereby boosting the input voltage and compensating the power factor of the input power source. Simultaneously, the power factor compensating unit 350 forms a waveform of the input current to be a since wave which is a waveform of the input voltage, thereby improving the waveform of the input current.

The power factor compensating unit 350 may also include a capacitor Cr for charging energy from the input power source and discharging energy to the smoothing unit 360 according to the input current amount control signal.

The smoothing unit 360 smoothes the AC voltage rectified by the active filter 340 into the DC voltage.

The inverter 370 converts the DC voltage smoothed by the smoothing unit 360 into a three-phase AC voltage.

As shown in FIG. 5, a method for supplying a DC power source comprises detecting an input current amount and determining and outputting a load size accordingly (S510), outputting a power factor control signal and an input current amount control signal based upon the determined load size (S520, S530 and S540), refluxing the input current by cutting off the input power source based upon the input current amount control signal (S531 and (S541), reducing a harmonic of the input current, rectifying an input AC voltage, and boosting a smoothing voltage (S532 and S542), supplying charged energy to the load based upon the power factor control signal (S533), smoothing the rectified input AC voltage into a DC voltage (S550), and converting the smoothed DC voltage into an AC voltage (S560).

The detecting of the input current amount and accordingly determining and outputting the load size includes determining the load sized based upon the input current amount detected by using a data table which is obtained by an experiment and stored in a memory, the data table showing a relation between the input current amount and the load size corresponding thereto.

Furthermore, the detecting of the input current amount and accordingly determining and outputting of the load size includes determining the load size by detecting a DC-link current.

The outputting of the power factor control signal and the input current amount control signal (S530 and S540) includes detecting a zero-crossing time point of the input power source and then generating a synchronous signal based upon the detected zero-crossing time point, and outputting an input current amount control signal to control a first switch S1 and a power factor control signal to control a second switch S2 based upon the determined load size.

Here, the input current amount control signal Si and the power factor control signal Sp are synchronized with the synchronous signal.

In generating the synchronous signal, a time point when the input power source becomes a zero voltage is detected to thereby generate and output the synchronous signal based upon the detected time point. Here, the synchronous signal is synchronized at a starting time point of plus (+) half-period or minus (−) half-period of the input power source.

In outputting the input current amount control signal and the power factor control signal, when the load size is smaller than a reference load size, the second switch S2 is turned off and then the input current amount control signal to control the first switch S1 is outputted, whereas when the load size is equal to or greater than the reference load size, both the input current amount control signal to control the first switch S1 and the power factor control signal to control the second switch S2 are outputted.

Here, in outputting the input current amount control signal and the power factor control signal, a switching time of each of the first switch S1 and the second switch S2 is varied based upon the load size.

In addition, in outputting the input current amount control signal and the power factor control signal, a PWM duty ratio of each of the input current amount control signal and the power factor control signal is determined in proportion to the load size.

Here, the input current amount control signal and the power factor control signal may preferably by generated by being synchronized with the synchronous signal.

The rectifying of the input current (S531 and S541) includes forming a reflux path of the input current toward the input power source, and cutting off the reflux path of the input current based upon the input current amount control signal.

The reducing of the harmonic of the input current, rectifying of the input AC voltage and boosting of the smoothing voltage (S532 and S542) includes reducing the harmonic and boosting the smoothing voltage, and rectifying the input AC voltage.

In more detail, in reducing the input current, rectifying the input current voltage and boosting the smoothing voltage (S532 and S542), the small reactor 331 is used to reduce the harmonic of the input current and prevent an influx of an inrush current, and the smoothing voltage is boosted by the switching of the second switch S2. Also, the diode bridge circuit 332 is used to fully rectify the input AC voltage supplied from the commercial power source.

In supplying the energy to the load (S533), a power factor of the input power source is compensated by charging and discharging energy based upon the power factor control signal. That is, the supplying of the energy to the load (S533) includes charging energy from the input power source to discharge the energy to the load based upon the power factor control signal (S534), and cutting off the path for charging/discharging energy.

In more detail, when the first switch S1 is turned on, the capacitor Cr refluxes the input current toward the input power source without being charged/discharged. On the other hand, when the first switch S1 is turned off, if the input power source is plus (+) by the switching of the second switch S2 based upon the power factor control signal, energy supplied from the input power source is charged in the capacitor Cr, whereas if the input power source is minus (−), the charged energy is discharged to the load.

In addition, in supplying the energy to the load (S533), the input AC voltage is boosted and the power factor of the input power source is compensated by alternately charging energy from the input power source and discharging the energy to the load in correspondence to the half-period of the input power source based upon the power factor control signal, and simultaneously a waveform of the input current is improved by forming the waveform of the input current to be a waveform of the input AC voltage (i.e., a sine wave).

In smoothing the rectified input AC voltage into the DC voltage (S550), the input AC voltage rectified by the active filter 340 is smoothed into the DC voltage.

The inverter 370 converts the DC voltage smoothed by the smoothing unit 360 into the three-phase AC voltage.

As described above, the input current amount is detected and the load size is determined based upon the detected input current amount, to thusly enable a control of the power factor compensation according to the load changes, whereby the power factor compensation spec can be satisfied in spite of the load changes and the power factor of the input power source can effectively be compensated by virtue of the power factor compensation operation.

In addition, in the present invention, the fluctuation of the input current can be prevented by performing the power factor compensation although using the reactor with the low capacity, which results in an effective reduction of a fabricating cost by virtue of using the reactor with the low capacity.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. An apparatus for supplying a direct current power source, comprising:
   an input current detector that detects an input current amount to determine a load size;
   a power factor controller that outputs a power factor control signal and an input current amount control signal according to the determined load size;
   an input current refluxer that refluxes the input current by cutting off an input power source based upon the input current amount control signal;
   an active filter that reduces a harmonic of the input current, rectifies an input alternating current (AC) voltage and boosts a smoothing voltage;
   a power factor compensator that charges energy from a commercial power source and supplies the charged energy to the load based upon the power factor control signal;
   a smoother that smooths the rectified AC voltage into a direct current (DC) voltage; and
   an inverter that converts the smoothed DC voltage into an AC voltage.

2. The apparatus of claim 1, wherein the input current detector further includes a memory that stores a data table indicating a relation between the input current amount and the load size corresponding thereto.

3. The apparatus of claim 1, wherein the input current detector determines the load size by detecting a DC-link current.

4. The apparatus of claim 1, wherein the power factor controller comprises:
   a synchronous signal generator that detects a zero-crossing time point of the input power source and generates a synchronous signal based upon the detected zero-crossing time point; and
   an on/off controller that outputs an input current amount control signal to control a first switch and a power factor control signal to control a second switch.

5. The apparatus of claim 4, wherein the input current amount control signal and the power factor control signal are generated by being synchronized with the synchronous signal.

6. The apparatus of claim 4, wherein the on/off controller turns off the second switch and outputs the input current amount control signal to control the first switch when the determined load size is smaller than a reference load size, and outputs both the input current amount control signal to control the first switch and the power factor control signal to control the second switch when the determined load size is equal to or greater than the reference load size.

7. The apparatus of claim 4, wherein the on/off controller determines a pulse width modulation (PWM) ratio of each of the input current amount control signal and the power factor control signal in proportion to the load size.

8. The apparatus of claim 1, wherein the input current refluxer comprises:
   a diode bridge circuit that forms a reflux path of the input current toward the input power source; and
   a first switch that turns on/off the reflux path of the input current based upon the input current amount control signal.

9. The apparatus of claim 1, wherein the active filter comprises:
   a small reactor that reduces a harmonic and boosts a smoothing voltage; and
   a diode bridge circuit that rectifies an input alternating current (AC) voltage.

10. The apparatus of claim 1, wherein the power factor compensator charges energy from the input power source and discharges energy to the load.

11. The apparatus of claim 1, wherein the power factor compensator comprises:
    a second switch that turns on/off a path for charging or discharging energy based upon the power factor control signal; and
    a capacitor that charges energy from the input power source and discharges energy to the smoothing unit.

12. A method for supplying a direct current power source, comprising:
    detecting an input current amount to determine a load size;
    outputting a power factor control signal and an input current amount control signal according to the determined load size;
    refluxing the input current by cutting off an input power source based upon the input current amount control signal;
    reducing a harmonic of the input current, rectifying the input AC voltage and boosting a smoothing voltage;
    charging energy from a commercial power source and supplying the charged energy to the load based upon the power factor control signal;
    smoothing the rectified input AC voltage into a DC voltage; and
    converting the smoothed DC voltage into an AC voltage.

13. The method of claim 12, wherein determining the load size comprises:
    using a data table stored in a memory, the data table indicating a relation between the input current amount and the load size corresponding thereto.

14. The method of claim 12, wherein determining the load size comprises determining the load size by detecting a DC-link current.

15. The method of claim 12, wherein outputting the power factor control signal and the input current amount control signal comprises:
    detecting a zero-crossing time point of the input power source and generating a synchronous signal based upon the detected zero-crossing time point; and
    outputting the input current amount control signal to control the first switch and the power factor control signal to control the second switch based upon the determined load size.

16. The method of claim 15, wherein outputting the input current amount control signal and the power factor control signal comprises:
    generating the input current amount control signal and the power factor control signal which are synchronized with the synchronous signal.

17. The method of claim 15, wherein outputting the input current amount control signal and the power factor control signal comprises:

varying a switching time of each of the first switch and the second switch based upon the load size.

18. The method of claim 15, wherein outputting the input current amount control signal and the power factor control signal comprises:

turning off the second switch and outputting the input current amount control signal to control the first switch, when the determined load size is smaller than a reference load size; and outputting both the input current amount control signal to control the first switch and the power factor control signal to control the second switch, when the determined load size is equal to or greater than the reference load size.

19. The method of claim 15, wherein outputting the input current amount control signal and the power factor control signal comprises:

determining a pulse width modulation (PWM) ratio of each of the input current amount control signal and the power factor control signal in proportion to the determined load size.

20. The method of claim 12, where refluxing the input current comprises:

forming a reflux path of the input current toward the input power source; and cutting off the reflux path of the input current based upon the input current amount control signal.

21. The method of claim 12, wherein supplying energy to the load comprises:

cutting off the second switch based upon the power factor control signal to accordingly charge energy in the capacitor from the input power source and discharge energy to the load.

* * * * *